2 Sheets--Sheet 1.

G. B. SMITH.
Corn and Bean Planters.

No. 153,622. Patented July 28, 1874.

WITNESSES:
G. Mathys.
Solon C. Kemon

INVENTOR:
Geo. B. Smith
BY
ATTORNEYS.

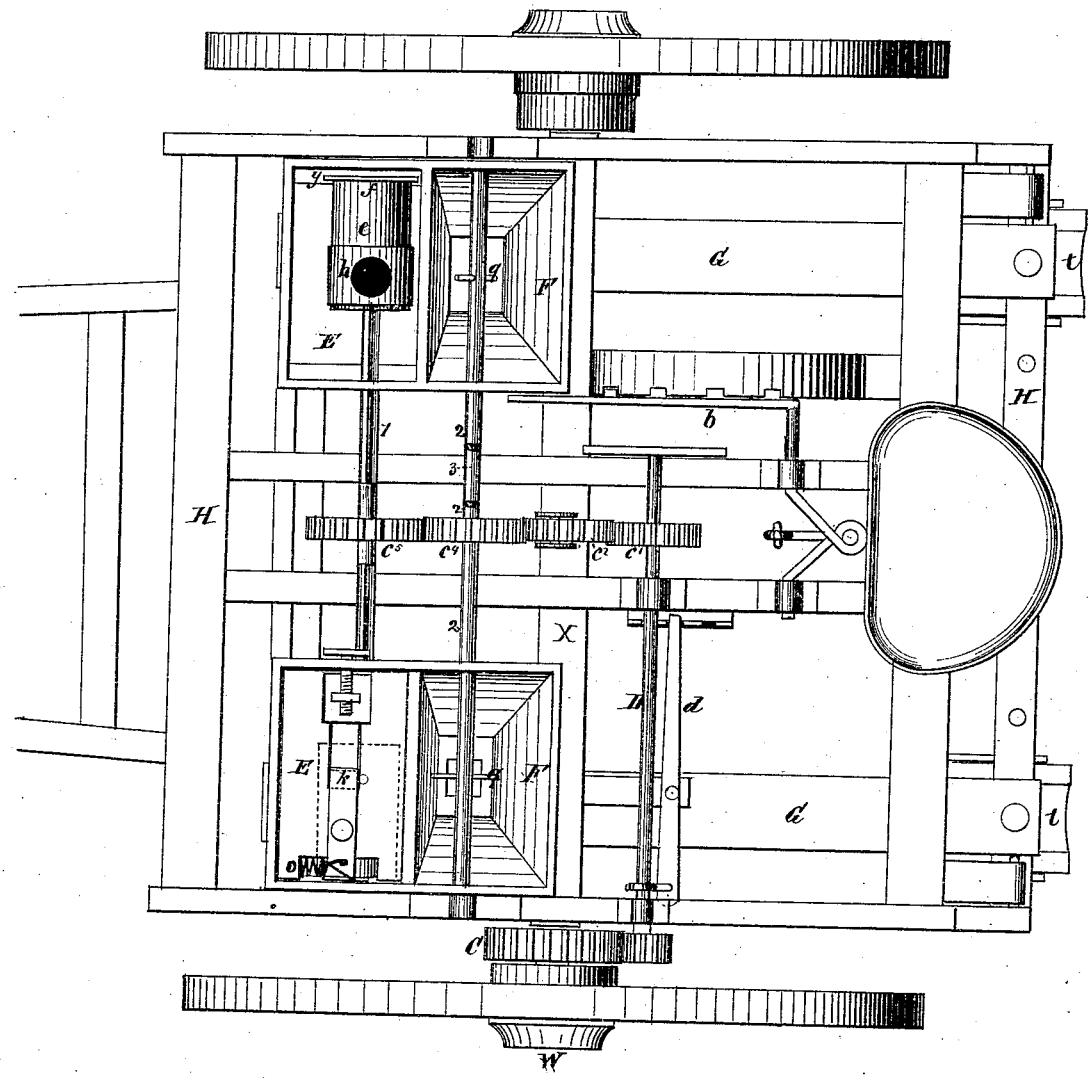

UNITED STATES PATENT OFFICE.

GEORGE BENSON SMITH, OF COBURG, CANADA.

IMPROVEMENT IN CORN AND BEAN PLANTERS.

Specification forming part of Letters Patent No. 153,622, dated July 28, 1874; application filed April 6, 1874.

*To all whom it may concern:*

Be it known that I, GEORGE BENSON SMITH, of Coburg, Province of Ontario, in the Dominion of Canada, have invented a new and Improved Corn and Bean Planter and Fertilizer; and I do hereby declare that the following is a full, clear, and exact description of the same, reference being had to the accompanying drawing forming a part of this specification, in which—

Figure 1:
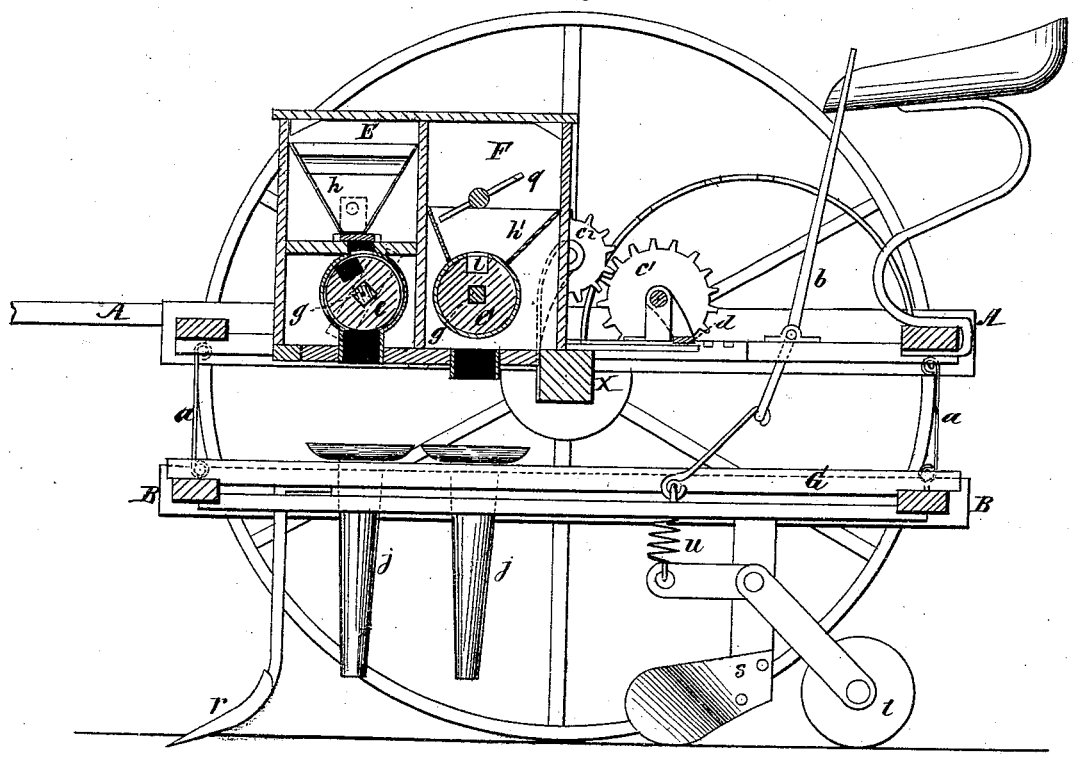
Figure 2:
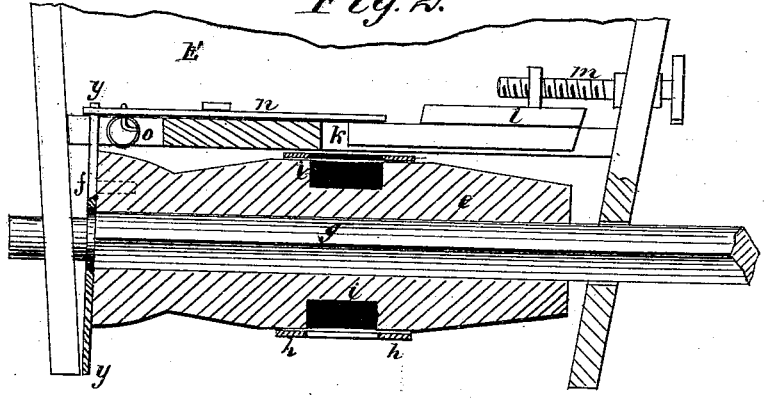

Figure 1 is a longitudinal vertical section. Fig. 2 is a vertical cross-section of the lower part of hopper E. Fig. 3 is a top view.

This invention relates to a new method of planting corn, beans, and other seed, in rows of any width, in combination with an attachment for fertilizing, covering, and rolling the same, and all in one operation.

This machine consists, in the main, of two parts—an upper or main frame, A A, which rests upon the axle X, and to which the cog-wheels and shafts are attached which drive the mechanism in the grain and fertilizer boxes, and a lower or supplemental frame, B B, which is attached to the upper frame by means of links $a$, and which is raised or lowered at pleasure by means of an elbow-lever, $b$, attached to the upper frame. To the hub of one of the main rolling wheels W is attached a cog-wheel, C, and on the upper frame, just behind the boxes, is a shaft, D, which communicates the motion of the cog-wheel on the hub to the shafts 1 2 3 of the boxes by a train of cog-wheels, $c^1 \cdot c^2\ c^3\ c^4\ c^5$. This connection may be made or broken by means of a lever, $d$, which throws the connecting-shaft out of the range of the cog-wheel C. Running across the machine in direction parallel to the axle X, are the three shafts, 1 2 3, which play in the two boxes, allowing said boxes to move upon them laterally, to suit the width of the rows desired. Each of these boxes is divided into two compartments—one for the grain-box E, and the other for the fertilizer F. In the grain-box E there is a cylinder, $e$, through which the shaft 1 passes, which shaft at this point is squared, in order to cause the cylinder to revolve by means of a metal plate, $f$, attached to the end of cylinder, (and extending beyond it, forming the arms $y$,) with a square aperture, $g$, to admit the shaft 1.

This cylinder revolves in a metal jacket, $h$, and has on its opposite sides two cup-shaped receptacles, $i\ i$, hollowed out, which, as the cylinder $e$ revolves, come directly beneath a similar-sized opening in the top of the jacket under the feed, and as the cylinder continues to revolve these cups are filled with grain, cut off by the jacket, and contents finally discharged through an opening in the bottom of the jacket into the funnel $j$ below, and out into the furrow. Above this cylinder and jacket, however, is the bottom of the grain-box E, which bottom contains the cut-off or feed. It consists of a slot, $k$, (the flow of seed through which is regulated by a slide, $l$, and screw $m$,) which is covered by an elongated metallic plate, $n$, fulcrumed in its center by a screw, and allowed to vibrate horizontally over and back from the hole $k$. The other end of this feed-plate $n$ is beveled, and as the projecting arm $y$ of the plate $f$, attached to the cylinder, strikes its beveled edge, the other end of feed-plate $n$ is withdrawn from the hole $k$, so many seed admitted from the box E, and after the arm has passed the feed-plate $n$, it is brought in place again by a spiral spring $o$. Above this there is an adjustable hopper, $h$, which is intended to facilitate the passage of the grain through the feed. The box for the fertilizer F is in the rear, adjoining that of the grain, and is in some respects like it. It has a similar shaft, 2, cylinder $e'$, jacket $h'$, and little cups $i\ i$, but this difference—that the cylinder and jacket revolve together. There is also no bottom with feed-plate $n$, spring $o$, and arm $f$, but only a simple hopper like the other, $h'$. In this hopper, however, revolves another shaft, 3, with arms $q\ q$, for the purpose of stirring up the fertilizer and making its flow continuous.

As the fertilizer is caught in the little cups $i\ i$ it is carried in the revolution of the cylinder, as in the grain-box, and deposited, through a similar funnel, $j$, into the furrow and upon the grain which has just fallen.

To the longitudinal bars G G of the supplemental frame are attached the aforementioned funnels $j\ j$, for the grain and fertilizer respectively, and immediately before them is a hoe or tooth, $r$, which prepares the furrow. Following them is a coverer, $s$, which is, in turn, followed by a concave roller, $t$, whose pressure is regulated by a spiral spring, $u$, and which, from its peculiar shape, leaves a slight ridge, which avoids the flooding of the seed by rain. Hoe, funnels, coverer, and roller, are all attached to the longitudinal bars G G of the supplemental frame, and can be moved laterally on the frame-work H H, to suit the adjustment of the boxes on the shafts.

Having thus described my invention, what I claim as new is—

1. The cylinders $e$, made adjustable to the width of the row by means of the squared shaft, in combination with the plate $f$, as and for the purpose specified.

2. The combination, with bottom-slotted grain-box E, of the squared shaft 1, hopper $h$, cylinder $e$, beveled vibratory plate $n$, plate $f$, having arm $y$, and jacket $h'$, all constructed and arranged substantially as and for the purpose specified.

3. In a corn-planter, the combination of the bars G G, frame H H, links $a$, lever $b$, hoes $r$, funnels $jj$, coverers $s$, and roller $t$, for forming a horizontal adjustable attachment, substantially as and for the purpose described.

The above specification of my invention signed by me this 13th day of March, A. D. 1874.

G. B. SMITH.

Witnesses:
SOLON C. KEMON,
CHAS. A. PETTIT.